(12) United States Patent
Durkee et al.

(10) Patent No.: US 10,793,033 B2
(45) Date of Patent: Oct. 6, 2020

(54) HEATING SYSTEM FOR AN OCCUPANT

(71) Applicant: Faurecia Automotive Seating, LLC, Auburn Hills, MI (US)

(72) Inventors: Chad W. Durkee, Auburn Hills, MI (US); Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 219 days.

(21) Appl. No.: 16/019,880

(22) Filed: Jun. 27, 2018

(65) Prior Publication Data

US 2020/0001756 A1 Jan. 2, 2020

(51) Int. Cl.
*B60N 2/56* (2006.01)
*H05B 3/34* (2006.01)

(52) U.S. Cl.
CPC .............. *B60N 2/5685* (2013.01); *H05B 3/34* (2013.01); *H05B 2203/014* (2013.01); *H05B 2203/029* (2013.01)

(58) Field of Classification Search
CPC ...... B60N 2/5685; B60N 2/0232; H05B 3/34; H05B 2203/014; H05B 2203/029; H05B 2203/005; H05B 2203/011; H05B 2203/017; H05B 2203/037; H05B 1/0272; H05B 1/0232; G05D 23/1906; G05D 23/24
See application file for complete search history.

(56) References Cited

U.S. PATENT DOCUMENTS

| 5,288,974 | A | * | 2/1994 | Hanzic | ................... | A47C 7/748 |
| | | | | | | 219/202 |
| 5,948,303 | A | | 9/1999 | Larson | | |
| 6,150,642 | A | | 11/2000 | Weiss | | |
| 9,078,291 | B2 | * | 7/2015 | Planelid | ............... | H05B 1/0238 |
| 2013/0264329 | A1 | | 10/2013 | Wang | | |
| 2014/0323799 | A1 | | 10/2014 | Van Driel | | |
| 2015/0230524 | A1 | | 8/2015 | Stevens | | |
| 2015/0232006 | A1 | | 8/2015 | Yu | | |

FOREIGN PATENT DOCUMENTS

| DE | 102013003564 | 3/2014 |
| JP | 2013001360 | 1/2013 |
| WO | 2015004345 | 1/2015 |

* cited by examiner

*Primary Examiner* — Shawntina T Fuqua
(74) *Attorney, Agent, or Firm* — Barnes & Thornburg LLP

(57) ABSTRACT

An occupant support comprises a vehicle seat including a seat bottom and a seat back coupled to the seat bottom. The occupant support further comprises a heating system located within the seat back of the vehicle seat. The heating system may be configured to provide a heating sensation to an occupant resting on the vehicle seat.

16 Claims, 2 Drawing Sheets

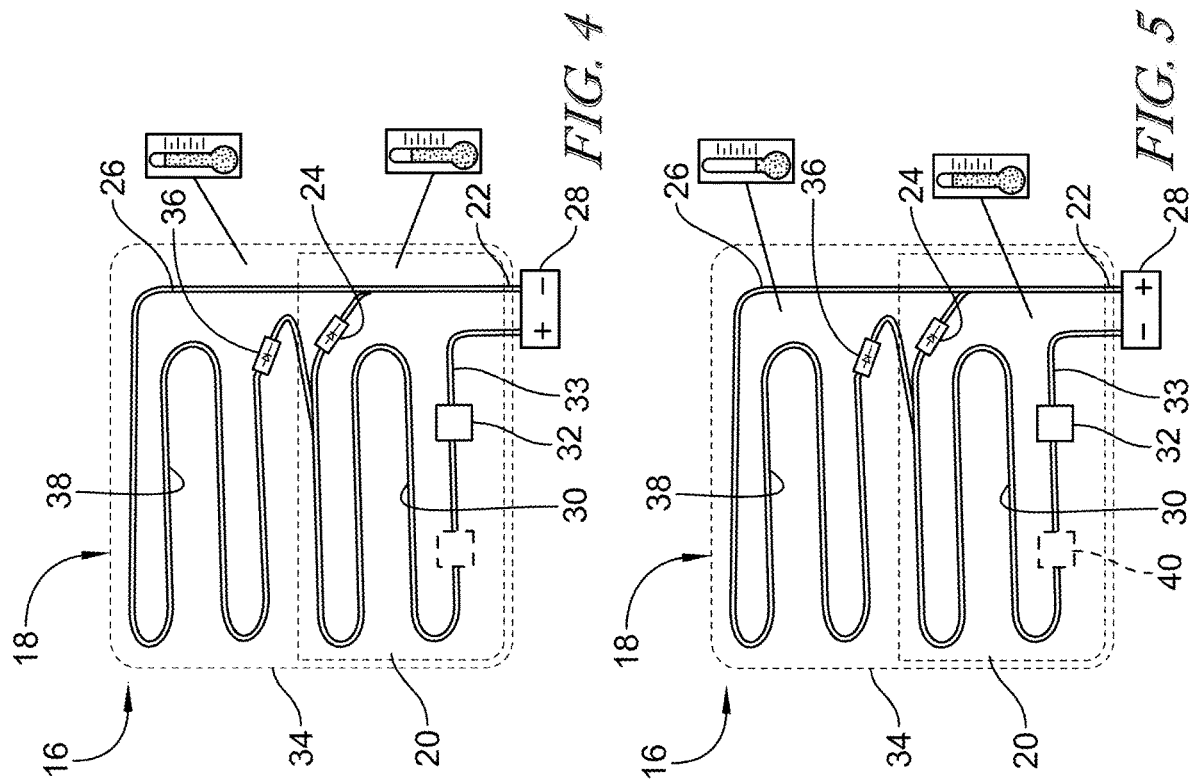
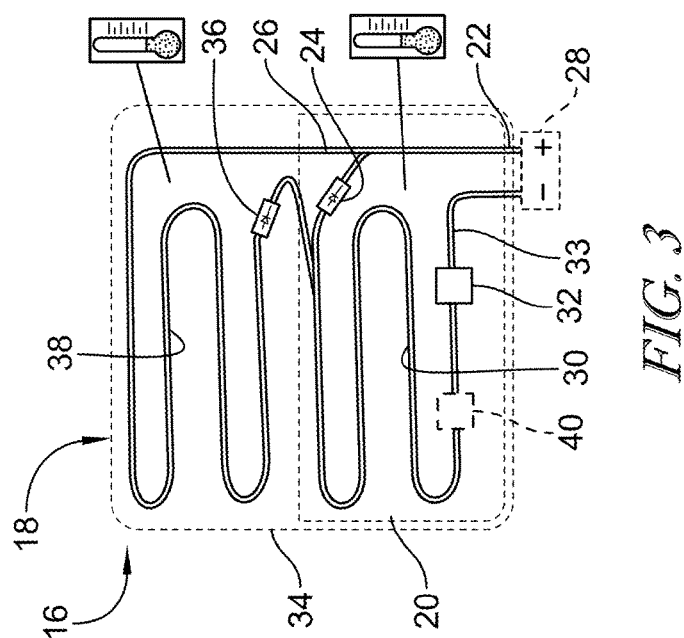

HEATING SYSTEM FOR AN OCCUPANT

BACKGROUND

The present disclosure relates to occupant supports, and particularly to seats for vehicles. More particularly, the present disclosure relates to heating portions of seats for vehicles.

SUMMARY

According to the present disclosure, an occupant support comprises a vehicle seat including a seat bottom and a seat back coupled to the seat bottom.

In illustrative embodiments, the occupant support comprises a heating system located within the seat back of the vehicle seat. The heating system may be configured to provide a heating sensation to an occupant resting on the vehicle seat.

In illustrative embodiments, the heating system includes a controller and a heat mat coupled to the controller. Illustratively, the heat mat may include a first zone comprising a first portion of the heat mat and a second zone comprising a second portion of the heat mat. The controller of the heating system may be coupled to the heat mat to cause power to be provided to the first zone or both the first zone and the second zone at the option of the occupant.

In illustrative embodiments, the heat mat includes a single heating circuit and a first diode coupled to the single heating circuit. The first diode may be configured to divert power to a first portion of the single heating circuit when power at a first polarity is supplied from the controller to cause the first zone to be active.

In illustrative embodiments, the heat mat further includes a second diode coupled to the heating circuit and configured to divert power to the entire single heating circuit when power at a second opposite polarity is supplied form the controller to cause the second zone to be active.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
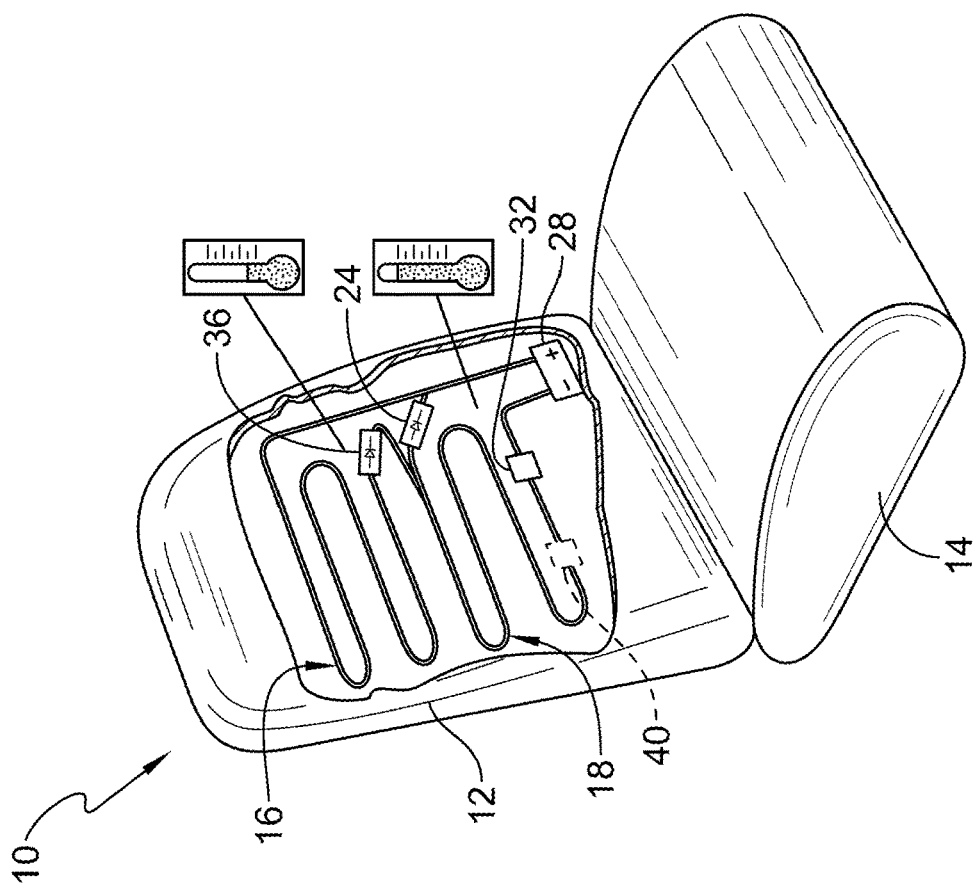
FIG. 1 is a perspective view of an occupant support including a seat bottom, a seat back extending up from the seat bottom, and a multi-zone heat mat located within the seat back, and further showing that no power is being applied to the heat mat resulting in an unheated seat back.
Figure 2:
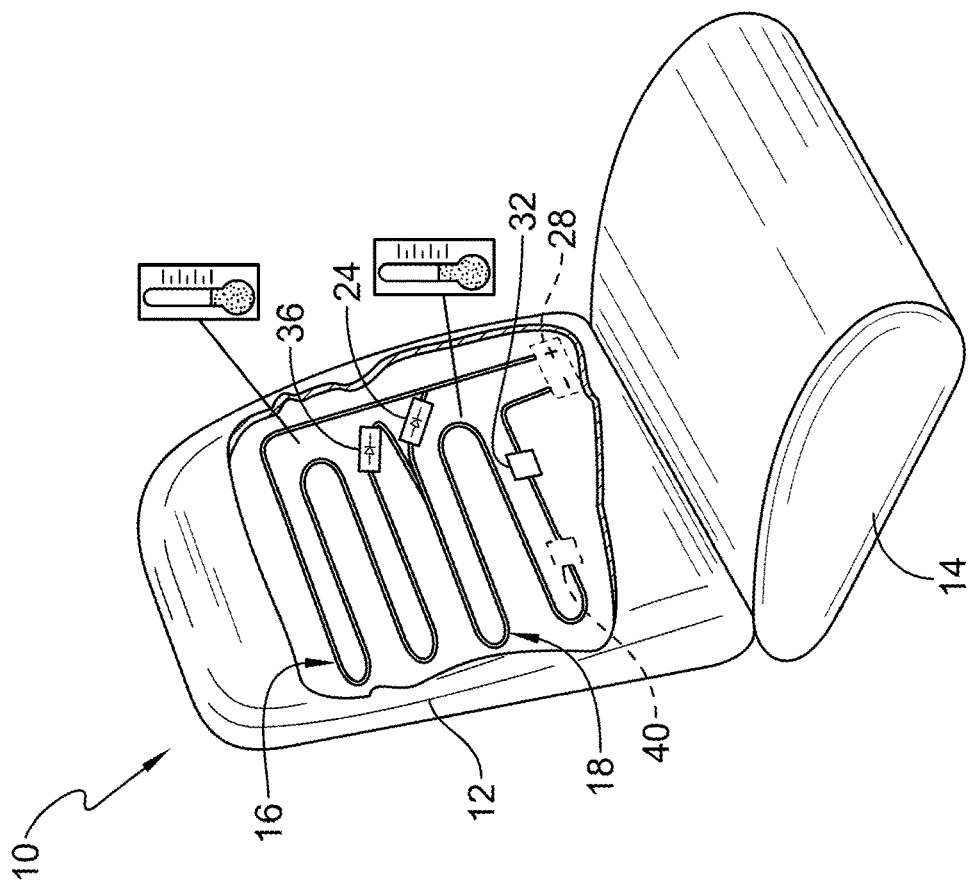
FIG. 2 is a diagrammatic view similar to FIG. 1, showing power being applied to the heat mat so that only a first zone of the heat mat is heated.

FIG. 3 is a diagrammatic view of the heat mat from FIGS. 1 and 2, showing that the heat mat includes a single heating circuit that extends through a first zone of the heat mat and a second zone of the heat mat, the heat mat including a first diode located in the first zone and second diode located in the second zone, and further showing that in the absence of power from the controller neither the first zone or second zone are heated;

FIG. 4 is a diagrammatic view similar to FIG. 3 showing power of a second polarity being applied to the entirety of the single heating circuit so that the second zone of the heat mat is heated; and FIG. 5 is a diagrammatic view similar to FIG. 4 showing that the first zone is heated and the second zone is unheated when power of a first polarity is supplied by the controller.

DETAILED DESCRIPTION

A multi-zone heating system 16 in accordance with the present disclosure is adapted for use with an occupant support 10 as shown in FIGS. 1-2. Occupant support 10 includes a seat back 12 and a seat bottom 14 coupled to seat back 12 to support an occupant in a seated position. Multi-zone heating system 16 includes a multi-zone heat mat 18 located within seat back 12. Multi-zone heating system 16 is configured to selectively heat portions of the heat mat 18, as shown in FIGS. 3-5, to provide a heating sensation to the occupant.

Multi-zone heating system 16 includes heat mat 18 and a controller 28, as shown in FIG. 3. Heat mat 18 is located in seat back 12 and is configured to heat portions of seat back 12, as shown in FIGS. 1 and 2. Controller 28 is connected to heat mat 18 and is configured to provide power to heat mat 18. Heat mat 18 and controller 28 cooperate to selectively heat all or a portion of seat back 12, as suggested in FIGS. 3-5.

Heat mat 18 includes a first zone 20, a single heating circuit 22, and a first diode 24, as shown in FIG. 3. First zone 20 includes a first portion of heat mat 18. Single heating circuit 22 completes a circuit with controller 28 and extends through heat mat 18. First diode 24 is coupled to heating circuit 22 and is configured to allow power of a first polarity to pass therethrough. Single heating circuit 22 and first diode 24 cooperate to divert power of a first polarity to a first portion of single heating circuit 22 to cause first zone 20 to be active.

Single heating circuit 22 includes an input lead 26, a first heating unit 30, a thermistor 32, and an output lead 33 as shown in FIGS. 3-5. Input lead 26 extends between and interconnects first diode 24 and controller 28. First heating unit 30 extends through first zone 20, as shown in FIG. 3. Output lead 33 is located between first heating unit 30 and controller 28. Thermistor 32 is located downstream first diode 24 and between first heating unit 30 and output lead 33. In some illustrative embodiments, heating system 16 includes a single thermistor 32.

Thermistor 32 is configured to de-activate single heating circuit 22 at a pre-determined temperature to minimize overheating of single heating circuit 22. In some embodiments, the maximum temperature for heat mat 18 before being de-activated by thermistor 32 is up to about 135° F., up to about 130° F., up to about 120° F., up to about 115° F., or up to about 110° F. In some embodiments, the maximum temperature for heat mat 18 before being de-activated by thermistor 32 is about 95° F., about 100° F., about 105° F., about 110° F., about 115° F., about 120° F., about 125° F., about 1130° F., about 135° F., or about 140° F.

Heat mat 18 further includes a second diode 36 and a second zone 34, as shown in FIGS. 3-5. Second zone 34 is larger than first zone 20, as shown in FIGS. 3-5. Second diode 36 is coupled to single heating circuit 22, as shown in FIGS. 3-5. Second diode 36 is configured to divert power to the entire single heating circuit 22 when power at a second opposite polarity is supplied from controller 28 to cause the second zone 34 to be active, as shown in FIG. 4. In some embodiments, second zone 34

Single heating circuit 22 further includes a second heating unit 38, as shown in FIGS. 3-5. Second heating unit 38 extends between input lead 26 and second diode 36, as shown in FIGS. 3-5. Second heating unit 38 and first heating unit 30 both receive power from controller 28 when controller 28 provides power at a second polarity so that second zone 34 is active. In some illustrative embodiments, second heating unit 38 does not include a thermistor.

A portion of input lead 26 and first heating unit 30 cooperate to form a first portion of single heating circuit 22, as suggested in FIGS. 3-5. Illustratively, the first portion of single heating circuit 22 is active when power of a first polarity is provided by controller 28 so that only first zone 20 provides heat. In some illustrative embodiments, thermistor 32 is located within the first portion of single heating circuit 22.

Single heating circuit 22 may further include a resistor 40, as shown in FIGS. 1-5. Resistor 40 is in-line with first heating unit 30, as shown in FIGS. 3-5. Resistor 40 is configured to decrease the current flow through first heating unit 30 when only first zone 20 is active. Illustratively, resistor 40 may decrease the number of on/off cycles of controller 28 when only first zone 20 is active.

Heated seats on the market today offer the option to heat the entire seat surface to provide a comfortable warm seat surface when the temperature is cold. Their primary purpose is to provide heat for comfort only. This invention allows for heating only specific zones (e.g., first zone 20 or second zone 34) of a seat (e.g., occupant support 10) to provide heat to relax sore muscles (specifically in your lower back).

Currently, to apply heat to your lower back to alleviate sore back muscles requires the occupant to turn on the heated seat in your vehicle. In some vehicles, this means heating the entire seat surface (both back and cushion) and at a minimum heating the entire back rest (e.g., seat back 12). During warm days this may not be desirable and possibly very uncomfortable. By allowing multiple heated zones (e.g., first zone 20 or second zone 34) within a single heat mat (e.g., heat mat 18), the occupant can optionally heat only their lower back (e.g., first zone 20) without heating the entire seat (e.g., seat back 12). The heating system 16 may also eliminate the need to use individual heat mats for each heated zone, which might also require potentially higher power consumption and a more complicated electrical architecture.

Each diode (e.g., first diode 24 and second diode 36) may be wired purposely to operate in reverse polarity to each other. For example, when power via the ECU (e.g., controller 28) is sent with polarity in one direction (e.g., power of a second polarity) the entire heat mat (e.g., second zone 34) would function (due to the diode (e.g., second diode 36) allowing for power to flow through the entire circuit, when power is sent (from the ECU (e.g., controller 28)) in reverse polarity (e.g., a first polarity) the heat mat (e.g., heat mat 18) may only function on the bottom half (e.g., first zone 20) due to the diode (e.g. first diode 24) diverting power within the circuit (e.g., the first portion of the single electrical circuit). An additional resistor (e.g., resistor 40) may be required to maintain consistent current flow in the lower circuit (e.g., the first portion of the single electrical circuit) due to a shorter circuit length.

The following numbered clauses include embodiments that are contemplated and non-limiting:

Clause 1. An occupant support including a vehicle seat including a seat bottom and a seat back coupled to the seat bottom and a heating system coupled to the vehicle seat and configured to provide a heating sensation to an occupant resting on the vehicle seat.

Clause 2. The occupant support of clause 1, any other clause, or combination of clauses, wherein the heating system includes a controller and a heat mat coupled to the controller.

Clause 3. The occupant support of clause 2, any other clause, or combination of clauses, wherein the heat mat includes a first zone comprising a first portion of the heat mat and a second zone comprising a second portion of the heat mat, the controller being coupled to the heat mat to cause power to be provided to the first zone or both the first zone and the second zone at the option of the occupant.

Clause 4. The occupant support of clause 3, any other clause, or combination of clauses, wherein the heat mat includes a single heating circuit, a first diode coupled to the heating circuit and configured to divert power to a first portion of the single heating circuit when power at a first polarity is supplied from the controller to cause the first zone to be active.

Clause 5. The occupant support of clause 4, any other clause, or combination of clauses, wherein the heat mat further includes a second diode coupled to the heating circuit and configured to divert power to the entire single heating circuit when power at a second opposite polarity is supplied form the controller to cause the second zone to be active.

Clause 6. The occupant support of clause 5, any other clause, or combination of clauses, wherein the heat mat further includes a thermistor located in the first portion of the single heating circuit downstream of the first and second diodes and configured to minimize overheating of the single heating circuit.

Clause 7. The occupant support of clause 5, any other clause, or combination of clauses, wherein the single heating circuit includes an input lead, a first heating unit, a second heating unit located between the input lead and the first heating unit, and an output lead located between the first heating unit and the controller.

Clause 8. The occupant support of clause 7, any other clause, or combination of clauses, wherein the second diode is located between the first heating unit and the second heating unit and is configured to allow current to pass therethrough when the controller provides power at the second opposite polarity.

Clause 9. The occupant support of clause 7, any other clause, or combination of clauses, wherein the second heating unit is not active when power of the first polarity is provided by the controller.

Clause 10. The occupant support of clause 7, any other clause, or combination of clauses, wherein a first portion of the lead, the first heating unit, and the first diode cooperate to form the first zone of the heat mat.

Clause 11. The occupant support of clause 10, any other clause, or combination of clauses, wherein power at the first polarity flows from the controller through the first portion of the input lead, the first diode, the first heating unit, a thermistor, and the output lead back to the controller.

Clause 12. The occupant support of clause 10, any other clause, or combination of clauses, wherein power at the second polarity flows from the controller through the input lead, the second heating unit, the second diode, the first heating unit, a thermistor, and the output lead back to the controller.

Clause 13. The occupant support of clause 10, any other clause, or combination of clauses, wherein the first zone, the second heating unit and the second diode cooperate to form the second zone.

Clause 14. The occupant support of clause 4, any other clause, or combination of clauses, wherein the heat mat further includes a resistor coupled to the first portion of the first portion of the single heating circuit.

Clause 15. The occupant support of clause 4, any other clause, or combination of clauses, wherein the heat mat further includes a second diode coupled to the heating circuit and configured to divert power to the entire single heating circuit when power at a second opposite polarity is supplied form the controller to cause the second zone to be active.

Clause 16. The occupant support of clause 15, any other clause, or combination of clauses, wherein the single heating circuit includes an input lead, a first heating unit, a second heating unit located between the input lead and the first heating unit, and an output lead located between the first heating unit and the controller.

Clause 17. The occupant support of clause 16, any other clause, or combination of clauses, wherein the second diode is located between the first heating unit and the second heating unit and is configured to allow current to pass therethrough when the controller provides power at the second opposite polarity.

Clause 18. The occupant support of clause 17, any other clause, or combination of clauses, wherein the second heating unit is not active when power of the first polarity is provided by the controller.

Clause 19. The occupant support of clause 4, any other clause, or combination of clauses, wherein the heat mat is located in the seat back.

The invention claimed is:

1. An occupant support comprising
a vehicle seat including a seat bottom and a seat back coupled to the seat bottom,
a heating system coupled to the vehicle seat and configured to provide a heating sensation to an occupant resting on the vehicle seat,
wherein the heating system includes a controller and a heat mat coupled to the controller, the heat mat including a first zone comprising a first portion of the heat mat and a second zone comprising a second portion of the heat mat, the controller being coupled to the heat mat to cause power to be provided to the first zone or both the first zone and the second zone at the option of the occupant,
wherein the heat mat includes a single heating circuit, a first diode coupled to the heating circuit and configured to divert power to a first portion of the single heating circuit when power at a first polarity is supplied from the controller to cause the first zone to be active,
wherein the heat mat further includes a second diode coupled to the heating circuit and configured to divert power to the entire single heating circuit when power at a second opposite polarity is supplied form the controller to cause the second zone to be active, and
wherein the single heating circuit includes an input lead, a first heating unit, a second heating unit located between the input lead and the first heating unit, and an output lead located between the first heating unit and the controller.

2. The occupant support of claim 1, wherein the heat mat further includes a thermistor located in the first portion of the single heating circuit downstream of the first and second diodes and configured to minimize overheating of the single heating circuit.

3. The occupant support of claim 1, wherein the second diode is located between the first heating unit and the second heating unit and is configured to allow current to pass therethrough when the controller provides power at the second opposite polarity.

4. The occupant support of claim 1, wherein the second heating unit is not active when power of the first polarity is provided by the controller.

5. The occupant support of claim 1, wherein a first portion of the input lead, the first heating unit, and the first diode cooperate to form the first zone of the heat mat.

6. The occupant support of claim 5, wherein power at the first polarity flows from the controller through the first portion of the input lead, the first diode, the first heating unit, a thermistor, and the output lead back to the controller.

7. The occupant support of claim 5, wherein power at the second polarity flows from the controller through the input lead, the second heating unit, the second diode, the first heating unit, a thermistor, and the output lead back to the controller.

8. The occupant support of claim 5, wherein the first zone, the second heating unit, and the second diode cooperate to form the second zone.

9. An occupant support comprising
a vehicle seat including a seat bottom and a seat back coupled to the seat bottom,
a heating system coupled to the vehicle seat and configured to provide a heating sensation to an occupant resting on the vehicle seat,
wherein the heating system includes a controller and a heat mat coupled to the controller, the heat mat including a first zone comprising a first portion of the heat mat and a second zone comprising a second portion of the heat mat, the controller being coupled to the heat mat to cause power to be provided to the first zone or both the first zone and the second zone at the option of the occupant,
wherein the heat mat includes a single heating circuit, a first diode coupled to the heating circuit and configured to divert power to a first portion of the single heating circuit when power at a first polarity is supplied from the controller to cause the first zone to be active, and
wherein the heat mat further includes a resistor coupled to the first portion of the single heating circuit.

10. The occupant support of claim 1, wherein the heat mat further includes a second diode coupled to the heating circuit and configured to divert power to the entire single heating circuit when power at a second opposite polarity is supplied form the controller to cause the second zone to be active;
the single heating circuit includes an input lead, a first heating unit, a second heating unit located between the input lead and the first heating unit, and an output lead located between the first heating unit and the controller;
the second diode is located between the first heating unit and the second heating unit and is configured to allow current to pass therethrough when the controller provides power at the second opposite polarity; and
the second heating unit is not active when power of the first polarity is provided by the controller.

11. The occupant support of claim 1, wherein the heat mat is located in the seat back.

12. The occupant support of claim 9, wherein the heat mat further includes a second diode coupled to the heating circuit and configured to divert power to the entire single heating circuit when power at a second opposite polarity is supplied form the controller to cause the second zone to be active.

13. The occupant support of claim 12, wherein the single heating circuit includes an input lead, a first heating unit, a second heating unit located between the input lead and the first heating unit, and an output lead located between the first heating unit and the controller.

14. The occupant support of claim 13, wherein the second diode is located between the first heating unit and the second heating unit and is configured to allow current to pass therethrough when the controller provides power at the second opposite polarity.

15. The occupant support of claim 14, wherein the second heating unit is not active when power of the first polarity is provided by the controller.

16. The occupant support of claim 9, wherein the heat mat is located only in the seat back.

* * * * *